United States Patent
Busch et al.

(10) Patent No.: US 12,253,080 B2
(45) Date of Patent: Mar. 18, 2025

(54) POSITIVE DISPLACEMENT MACHINE, METHOD, VEHICLE AIR CONDITIONING SYSTEM, AND VEHICLE

(71) Applicant: OET GMBH, Lustenau (AT)

(72) Inventors: Christian Busch, Feldkirch (AT); Jochen Bont, Feldkirch (AT); Markus Öttl, Lustenau (AT); Roman Lässer, Wolfurt (AT)

(73) Assignee: OET GmbH, Lustenau (AT)

( * ) Notice: Subject to any disclaimer, the term of this patent is extended or adjusted under 35 U.S.C. 154(b) by 3 days.

(21) Appl. No.: 17/995,457

(22) PCT Filed: Mar. 30, 2021

(86) PCT No.: PCT/EP2021/058251
§ 371 (c)(1),
(2) Date: Oct. 4, 2022

(87) PCT Pub. No.: WO2021/204592
PCT Pub. Date: Oct. 14, 2021

(65) Prior Publication Data
US 2023/0167821 A1 Jun. 1, 2023

(30) Foreign Application Priority Data
Apr. 9, 2020 (DE) ............... 10 2020 110 097.3

(51) Int. Cl.
*F04C 18/02* (2006.01)
*B60H 1/32* (2006.01)
*F04C 29/12* (2006.01)

(52) U.S. Cl.
CPC ....... *F04C 18/0215* (2013.01); *B60H 1/3223* (2013.01); *F04C 29/12* (2013.01)

(58) Field of Classification Search
CPC .............. F04C 18/0215; F04C 18/0253; F04C 18/0261; F04C 29/12; F04C 18/02
See application file for complete search history.

(56) References Cited

U.S. PATENT DOCUMENTS 4,396,364 A * 8/1983 Tojo ............... F01C 1/0215
418/59
4,545,747 A * 10/1985 Tamura ............ F04C 28/26
418/98

(Continued)

FOREIGN PATENT DOCUMENTS

CN 107575380 1/2018
DE 10 2017 105 175 8/2018

(Continued)

OTHER PUBLICATIONS

Search Report issued in corresponding German Patent Application No. 10 2020 110 097.3, Feb. 16, 2021, 10 pages.

(Continued)

*Primary Examiner* — Deming Wan
(74) *Attorney, Agent, or Firm* — HSML P.C.

(57) ABSTRACT

The invention relates to a scroll-type positive displacement machine, in particular a scroll compressor, comprising a highpressure chamber (11), a low-pressure chamber (12), an orbiting displacement spiral (13), a counter spiral (14), and a counterpressure chamber (15) which is located between the low-pressure chamber (12) and the displacement spiral (13), wherein an outlet opening (16), through which a compressed working medium flows into the high-pressure chamber (11) during operation, is centrally arranged in the counter spiral (14) in a high-pressure region, and wherein the displacement spiral (13) has at least a first and a second passage opening (17*a*, 17*b*) for fluidic connection to the counter-pressure chamber (15), wherein at least the first passage opening (17*a*) is arranged in the region of the outlet (Continued)

Figure 1:
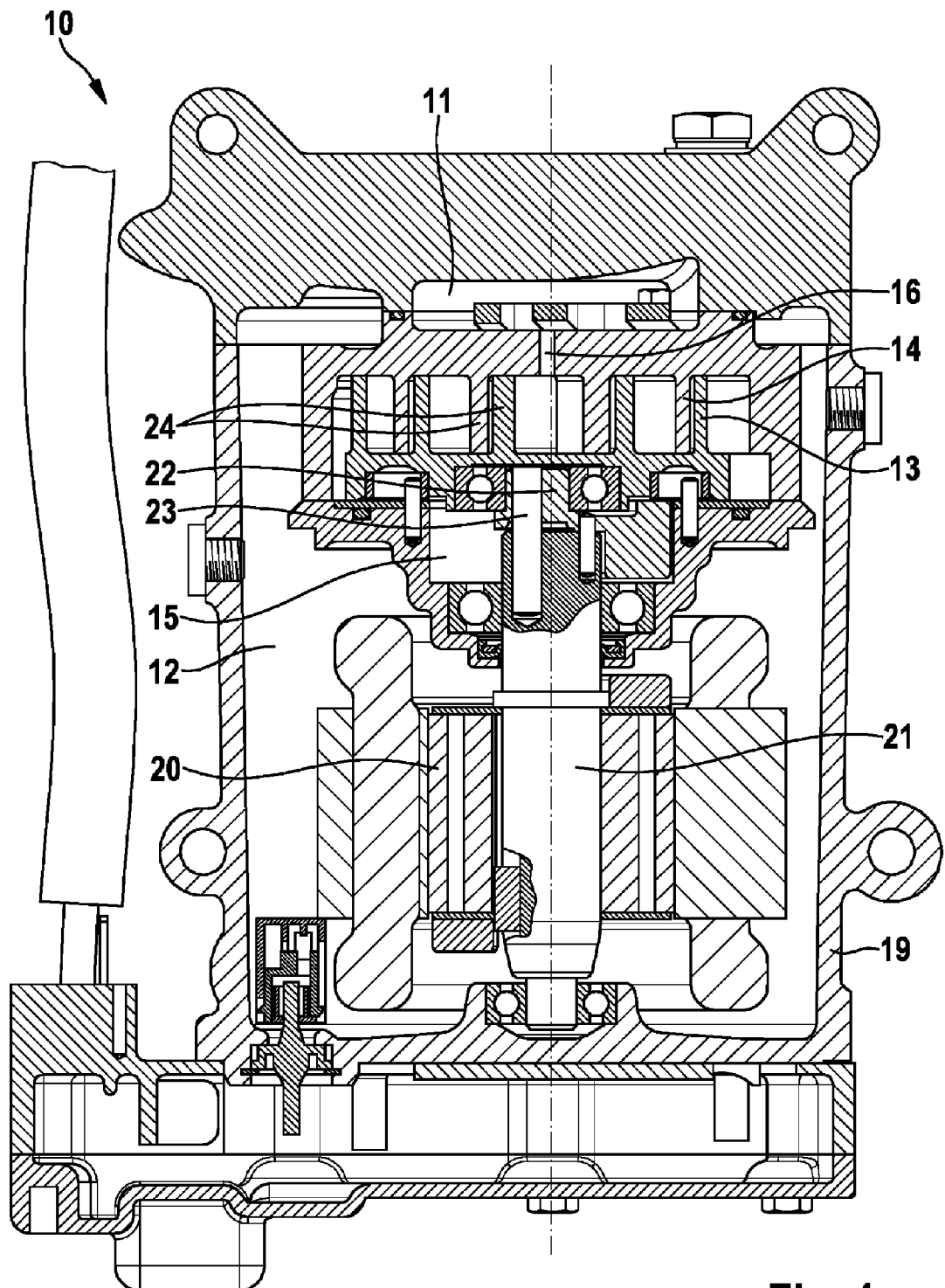

opening (16) so that, during operation, the first passage opening (17a) and the outlet opening (16) temporarily overlap at least in sections.

14 Claims, 11 Drawing Sheets

(56) References Cited

U.S. PATENT DOCUMENTS

| | | |
|---|---|---|
| 2012/0164014 A1 | 6/2012 | Nagahara et al. |
| 2014/0154121 A1* | 6/2014 | Doepker .............. F04C 28/16 418/22 |
| 2014/0348681 A1* | 11/2014 | Obrist .............. F04C 18/0284 418/55.5 |
| 2015/0104342 A1 | 4/2015 | Yamazaki et al. |
| 2018/0258933 A1 | 9/2018 | Obrist et al. |
| 2018/0335031 A1 | 11/2018 | Guntermann et al. |
| 2018/0335032 A1 | 11/2018 | Obrist et al. |

FOREIGN PATENT DOCUMENTS

| | | |
|---|---|---|
| DE | 10 2017 110 913 | 8/2018 |
| DE | 10 2017 110 759 | 11/2018 |
| EP | 2 474 740 | 7/2012 |
| JP | 2011-052603 | 3/2011 |
| JP | 2014-228002 | 12/2014 |
| JP | 2018-150932 | 9/2018 |
| WO | 2016/189598 | 12/2016 |

OTHER PUBLICATIONS

International Search Report issued in International Application No. PCT/EP2021/058251, Jun. 25, 2021, 14 pages w/ translation.
English translation of the Notice of Reasons for Rejection issued in corresponding Japanese Patent Application No. 2022-559680, Jul. 9, 2024, 10 pages.

* cited by examiner

POSITIVE DISPLACEMENT MACHINE, METHOD, VEHICLE AIR CONDITIONING SYSTEM, AND VEHICLE

The invention relates to a scroll-type positive displacement machine according to the preamble of claim 1. The invention further relates to a method, a vehicle air conditioning system, and a vehicle.

A positive displacement machine of the kind mentioned at the outset is known from DE 10 2017 105 175 B3. DE 10 2017 105 175 B3 describes a scroll compressor, which comprises a displacement spiral and a counter spiral. The displacement spiral engages into the counter spiral. The orbiting displacement spiral forms compression chambers, in which a coolant is compressed. In order to enable a compression of the coolant, the displacement spiral must abut tightly against the counter spiral. Therefore, it is advantageous that the displacement spiral be pressed against the counter spiral. To this end, a counter-pressure chamber is arranged on the side of the displacement spiral facing away from the counter spiral. Such a counter-pressure chamber is also known by the designation back-pressure room. The counter-pressure chamber or back-pressure room functions to build up a pressure. For this purpose, the displacement spiral comprises two openings, which fluidically connect the counter-pressure chamber or back-pressure room with a compression chamber. The pressure in the back-pressure room acts on the displacement spiral with a force that presses the displacement spiral against the counter spiral, so that both spirals are sealed fluid tight relative to each other.

In known scroll compressors of the kind mentioned at the outset, the pressure in the counter-pressure chamber must be just high enough to press the displacement spiral against the counter spiral in such a way that the displacement spiral abuts against the counter spiral in a fluid tight manner. However, the pressure should not be so high that frictional forces arise, which slow down the orbiting motion of the displacement spiral or lead to performance losses.

Providing a high enough pressure for the counter-pressure chamber to press the displacement spiral against the counter spiral while in the process causing the least possible performance losses is associated with a constructive outlay.

Therefore, the object of the present invention is to indicate a positive displacement machine which improves the generation of pressure in the counter-pressure chamber for pressing the displacement spiral against the counter spiral, thereby enabling a simple and cost-effective construction for the positive displacement machine. It is further the object of the invention to indicate a method, a vehicle air conditioning system, and a vehicle.

According to the invention, the object is achieved with regard to

The positive displacement machine by the subject matter of claim 1,
The method by the subject matter of claim 12,
The vehicle air conditioning system by the subject matter of claim 13, and
The vehicle by the subject matter of claim 14.

Specifically, the object is achieved by a scroll-type positive displacement machine, in particular a scroll compressor, with a high-pressure chamber, a low-pressure chamber, an orbiting displacement spiral, a counter spiral and a counter-pressure chamber, which is arranged between the low-pressure chamber and the displacement spiral. An outlet opening, through which a compressed working medium flows into the high-pressure chamber during operation, is centrally arranged in the counter spiral in a high-pressure region, and wherein the displacement spiral has at least a first and a second passage opening for fluidic connection with the counter-pressure chamber, wherein at least the first passage opening is arranged in the region of the outlet opening, so that, during operation, the first passage opening and the outlet opening temporarily overlap at least in sections.

The high-pressure chamber is the region in which the compressed working medium flows before it is again fed to a circuit, for example a cooling circuit.

The low-pressure chamber can also be referred to as an intake chamber. The gas flows out of the low-pressure chamber from radially outside between the counter spiral and displacement spiral.

The orbiting motion of the displacement spiral is to be understood as a motion on a circular path.

The working medium preferably involves a cooling fluid, especially preferably a gaseous cooling fluid, for example $CO_2$.

The outlet opening is arranged in the center or middle of the counter spiral. In other words, the outlet opening is arranged in the region of the midpoint of the counter spiral.

The outlet opening advantageously has a valve. After compression, the working medium flows through the outlet opening into the high-pressure chamber. The working medium is again fed to a working circuit, in particular to a cooling circuit, through the high-pressure chamber.

The first outlet opening and second outlet opening each establish a fluidic connection with the counter-pressure chamber.

At least the first passage opening is arranged in the region of the central outlet opening. The passage openings are arranged in the displacement spiral, and the outlet opening is arranged in the counter spiral. The first passage opening is thus arranged opposite the outlet opening. As a result, the first passage opening can be arranged at least temporarily in a high-pressure region.

The first passage opening and the outlet opening are arranged in parallel planes offset from each other, and temporarily overlap at least in sections during operation of the positive displacement machine. Overlapping here means that, in a top view of the two planes, the first passage opening is tangent to, intersects and/or touches an outer contour of the outlet opening.

In other words, overlapping is to be construed in such away that, when the parallel planes are superimposed, the first passage opening and the outlet opening have at least one common intersection at least at one point in time during operation of the displacement spiral.

The advantage to this is that a high enough pressure can be generated in the counter-pressure chamber to press the displacement spiral against the counter spiral.

Since the first passage opening and the outlet opening temporarily overlap at least in sections, the first passage opening remains in the high-pressure region over a largest possible angular range of the rotation angle of the displacement spiral, and hence over a longest possible period of time, and establishes a fluid connection with the counter-pressure chamber.

The fluid connection generates a pressure in the counter-pressure chamber. By temporarily arranging the first passage opening in a region of the outlet opening, the pressure for pressing the displacement spiral against the counter spiral is adjusted in such a way that frictional forces which slow down the orbiting motion of the displacement spiral and lead to performance losses are kept as low as possible, while the displacement spiral is simultaneously arranged fluid tightly enough against the counter spiral.

Furthermore, the two passage openings allow a continuous fluid connection with the counter-pressure chamber. As a result, additional fluid connections with the counter-pressure chamber are not required. This enables a more compact and cost-effective design of the positive displacement machine.

Preferred embodiments of the invention are indicated in the subclaims.

In an especially preferred embodiment, the second passage opening is arranged in a region of the displacement spiral that has a lower pressure than the pressure in the high-pressure region during operation.

This makes it possible to expose the counter-pressure chamber to a high pressure, for example when the compressed working medium in the compression chambers exerts a large force in the direction of the counter-pressure chamber on the displacement spiral. If the pressure exerted by the compressed working medium on the displacement spiral is low, the pressure in the counter-pressure chamber can also be set low, so as to minimize performances losses.

In another especially preferred embodiment, the first passage opening is fluidically connected with the counter-pressure chamber in an angular range of the rotation angle of the orbiting displacement spiral of 435° to 650°.

The angular range of the rotation angle in which the first passage opening is fluidically connected with the counter-pressure chamber is advantageous, since this enables a fluid connection between the compression chambers and counter-pressure chamber over a largest possible region of the rotation angle of the orbiting displacement spiral. In addition, the compression of the working medium, and thus the pressure after a large rotation angle, is high, so that the counter-pressure chamber can be exposed to a high enough pressure.

In a preferred embodiment, the first passage opening temporarily overlaps the outlet opening by between 1% and 100%, in particular between 10% and 90%, in particular between 20% and 80%, in particular between 30% and 70%, in particular between 40% and 60%.

A largest possible overlap allows the first passage opening to be arranged in the high-pressure region of the positive displacement machine for as long as possible. This enables an advantageously large timespan in which the first passage opening is open. Different gradations of the overlap make it possible to adjust the timespan in which the first passage opening and the outlet opening overlap.

In another preferred embodiment, at least a first and a second compression chamber are designed to temporarily receive a working medium during operation, and the second passage opening is arranged in the displacement spiral, so that during operation, the orbiting motion of the displacement spiral causes the second passage opening to be temporarily arranged at least in sections in the first compression chamber, and subsequently temporarily at least in sections in the second compression chamber.

As a result, the counter-pressure chamber is temporarily additionally fluidically connected alternatingly with the first compression chamber and with the second compression chamber by the second passage opening. This makes it possible for the counter-pressure chamber to be fluidically connected with at least one of the compression chambers and/or the high-pressure region in the region of the outlet.

It is especially preferred that the second passage opening be arranged in an angular range of the rotation angle of the orbiting displacement spiral of 95° to 250° in the first compression chamber, and in an angular range of 285° to 650° in the second compression chamber.

The angular ranges of the rotation angle in which the second passage opening is temporarily arranged in the first and second compression chambers are advantageous, since the second passage opening is thereby fluidically connected with the counter-pressure chamber as long as possible.

Furthermore, compression has advanced in the compression chambers given a large rotation angle. In this way, the counter-pressure chamber can be exposed to a higher pressure than given a small rotation angle. Expressed differently, the passage opening is arranged in the first or in the second compression chamber only starting at a rotation angle where the pressure in the compression chambers is high enough to generate enough pressure in the counter-pressure chamber, and press the displacement spiral against the counter spiral in a fluid tight manner and with low performance losses.

It is preferred that the first and/or second passage opening be arranged in a section of the floor of the displacement spiral. This is advantageous, since it facilitates passage of the counter spiral through the passage opening.

In addition, a straight and shortest possible connection with the counter-pressure chamber can be realized in this way.

It is advantageous for the first passage opening to have a smaller diameter than the second passage opening, wherein the diameters measure between 0.1 mm and 1 mm.

In particular, it is advantageous for the first passage opening to have a diameter of 0.3 mm, and/or the second passage opening to have a diameter of 0.5 mm.

The different diameters make it possible to adjust the first and the second passage opening to the pressures in the compression chambers. In the radially inner region of the intermeshing spirals, the compression level, and hence the pressure of the working medium, is higher than in the radially outer region of the intermeshing spirals. The first passage opening is arranged in a radially inner region of the displacement spiral with a high compression level. The second passage opening is preferably arranged in a radially outer region with a lower compression level than in the radially inner region. The diameter of the first passage opening is smaller, and thereby throttles the fluid flow from the region with a high compression level or the high-pressure region into the counter-pressure chamber. The pressure is lower in the radially outer region, so that a larger diameter of the second passage opening is advantageous for exposing the counter-pressure chamber to enough pressure to press the displacement spiral against the counter spiral.

In an advantageous embodiment, the first and/or second passage opening has a circular, elliptical, or ovoid cross section.

This enables various advantageous embodiments of the passage opening, which influence the flow characteristics of the working medium. For example, it is possible for the region of the first passage opening exposed first during operation while passing the counter spiral to have a larger cross section than a region that is still covered by the counter spiral. As a result, a sufficient fluid connection is established with the counter-pressure chamber even before the passage opening is completely opened.

In a preferred embodiment, the displacement spiral and/or the counter spiral have a chamfer at least in sections.

The chamfer makes it possible to reduce the region of the rotation angle traversed by the first and/or second passage opening so as to pass the counter spiral. In this way, the chamfer makes it possible to shorten the timespan for which a passage opening is closed.

Disclosed and claimed within the framework of the invention is a method for operating a positive displacement machine, in which, during operation of the positive displacement machine, at least sections of the first passage opening temporarily overlap the outlet opening centrally arranged in the counter spiral, and a fluid connection is formed with the counter-pressure chamber.

Also disclosed and claimed within the framework of the invention is a vehicle air conditioning system and a vehicle with a vehicle air conditioning system.

The invention will be explained in more detail below based upon exemplary embodiments with reference to the attached drawings.

Figure 2:
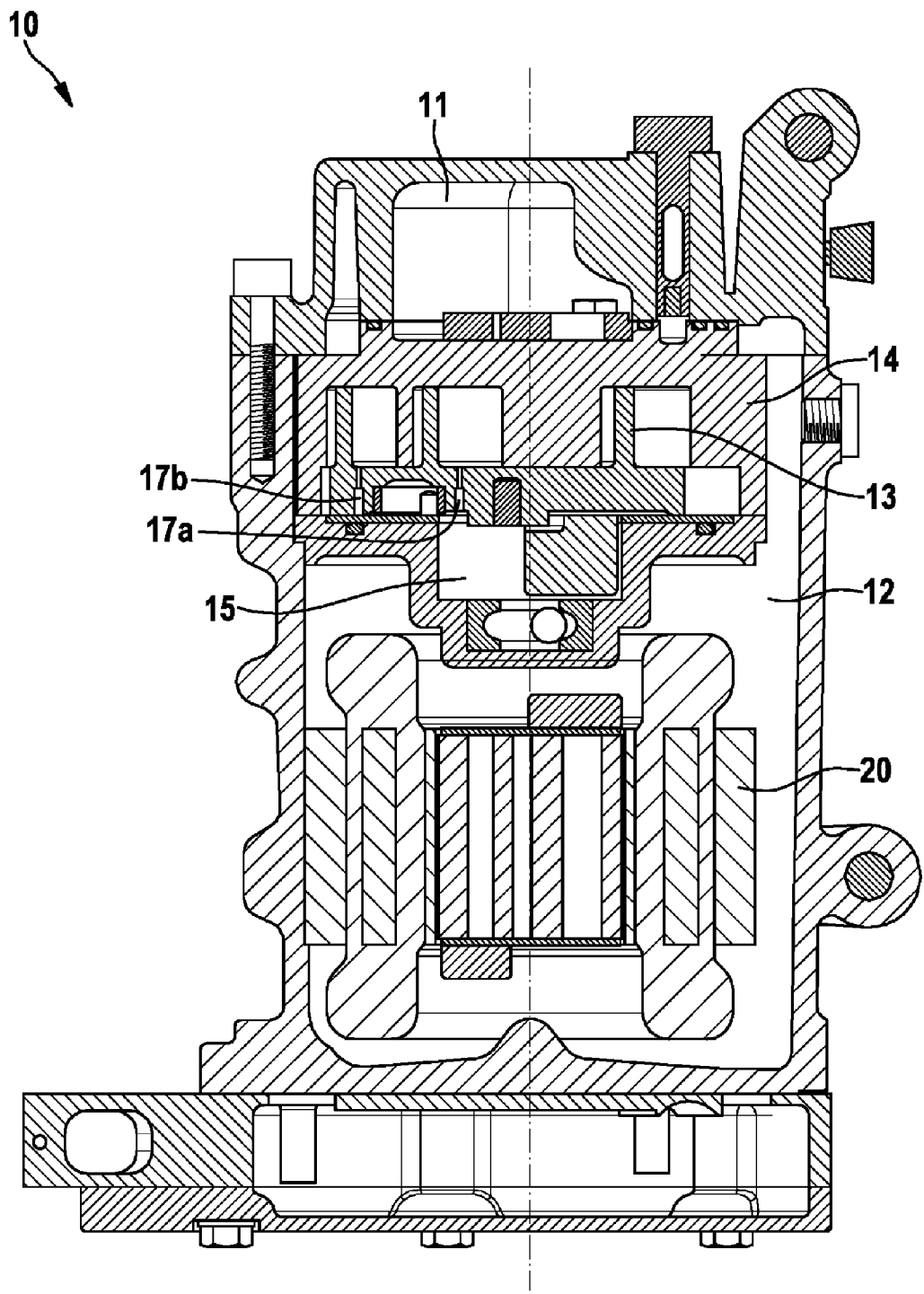
Figure 3:
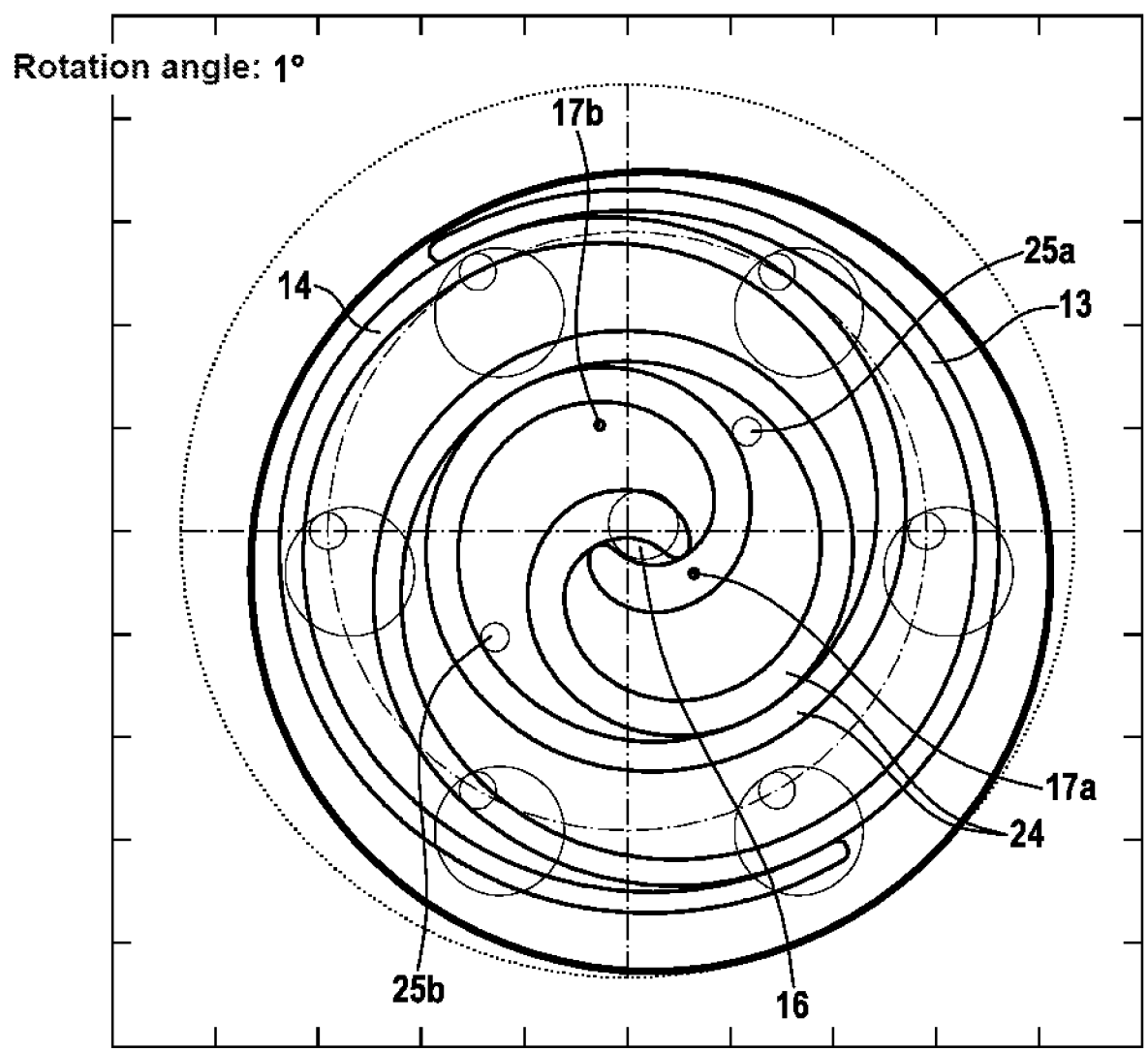
Figure 4:
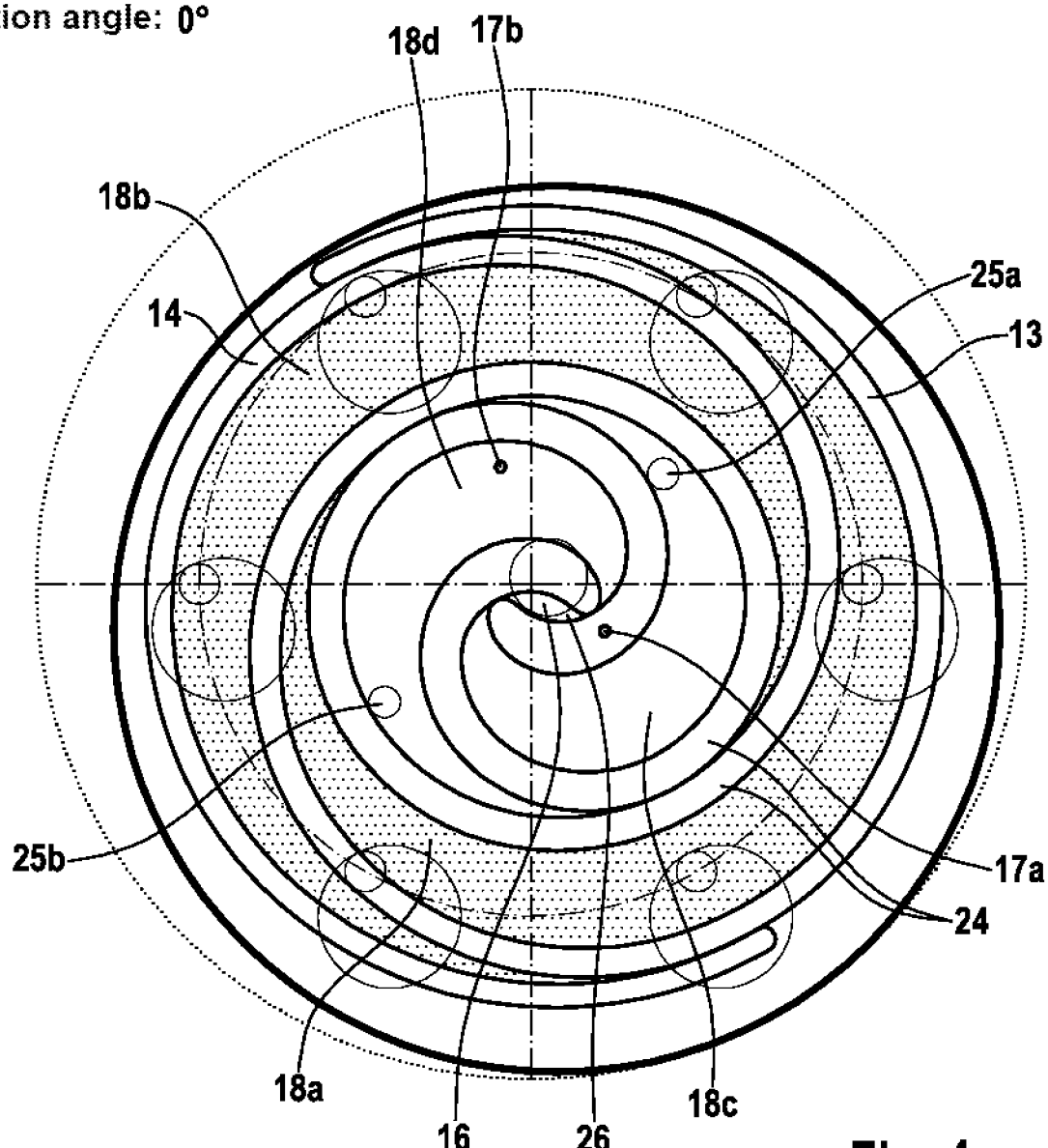
Figure 5:
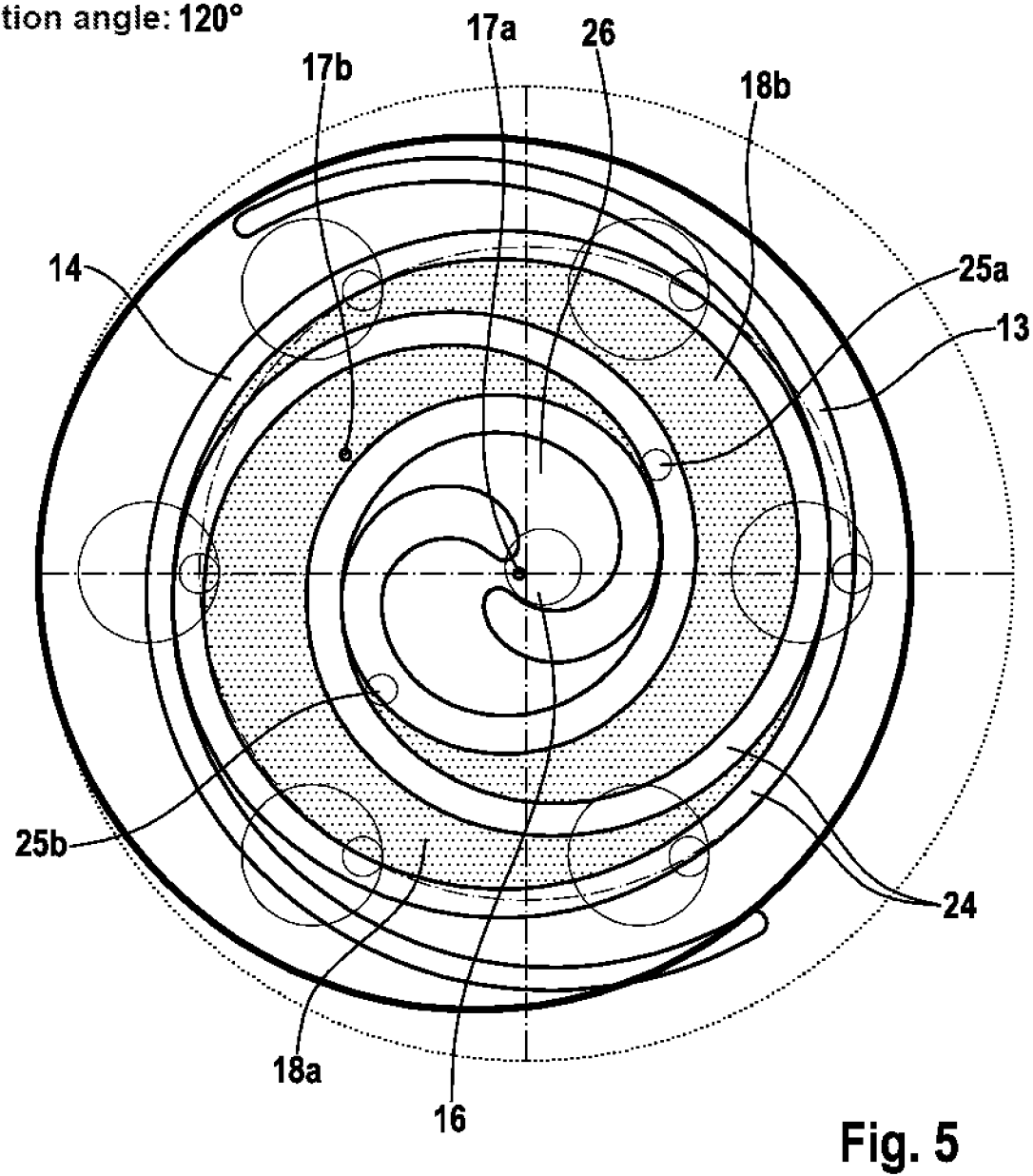
Figure 6:
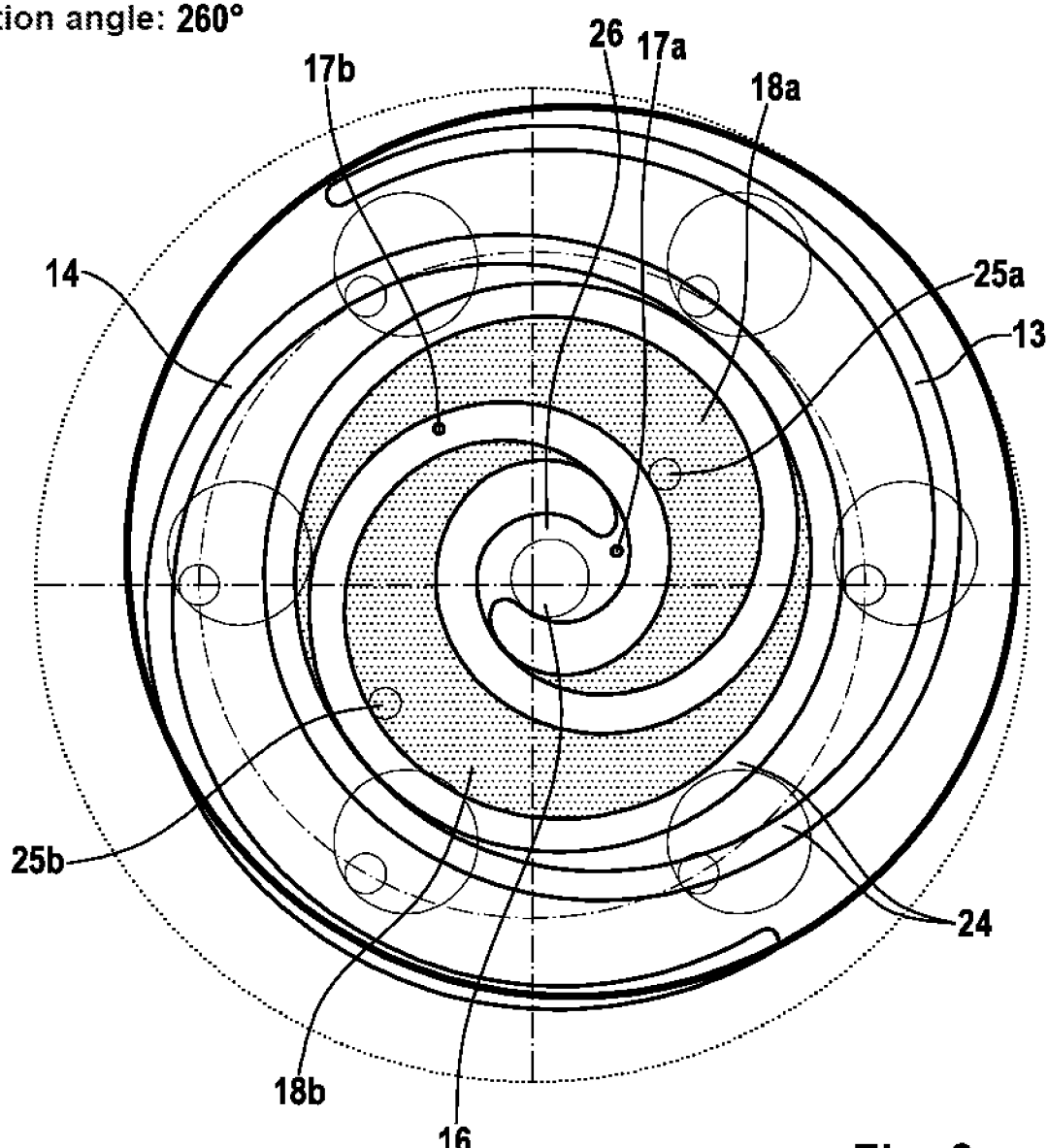
Figure 7:
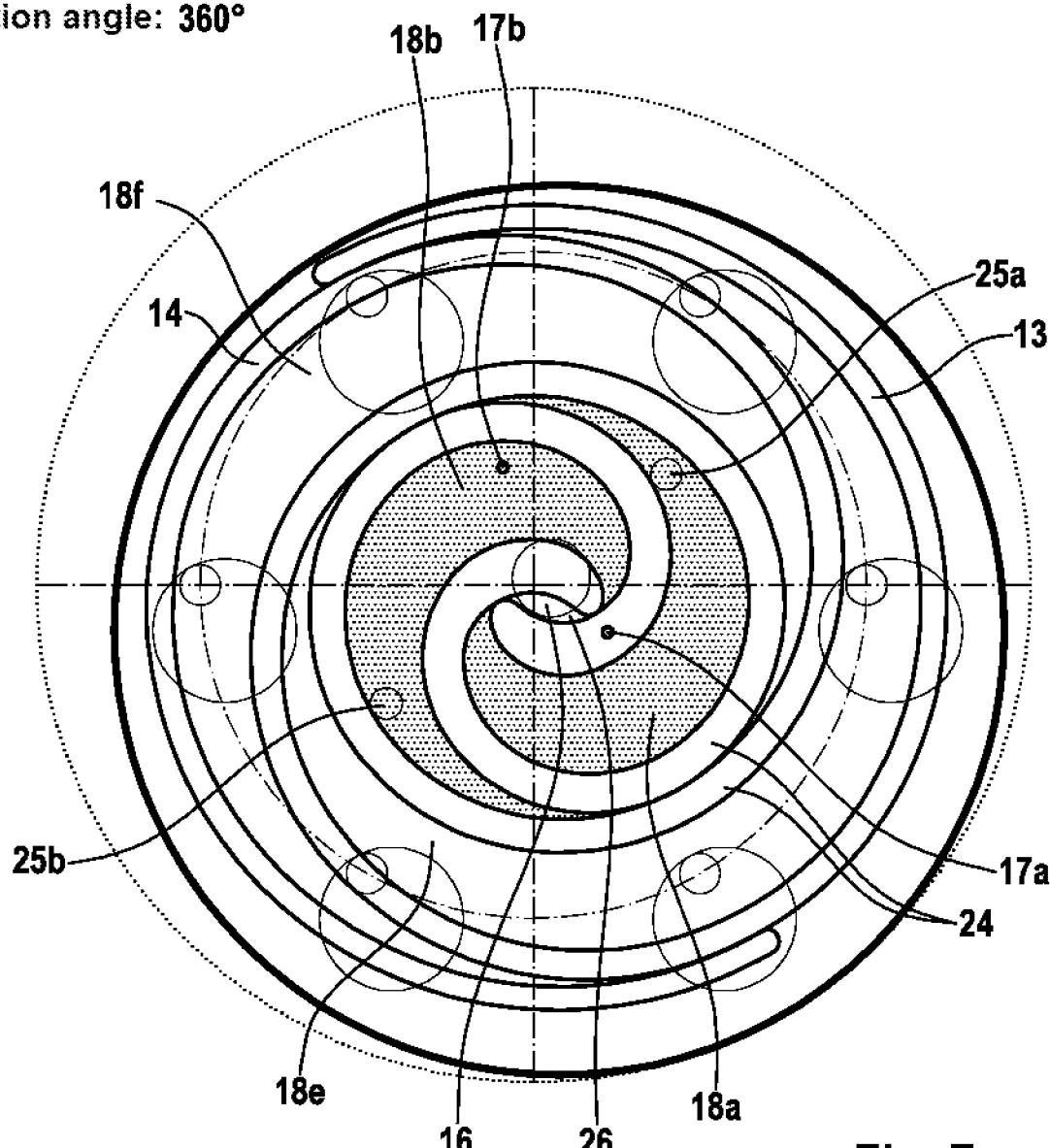
Figure 8:
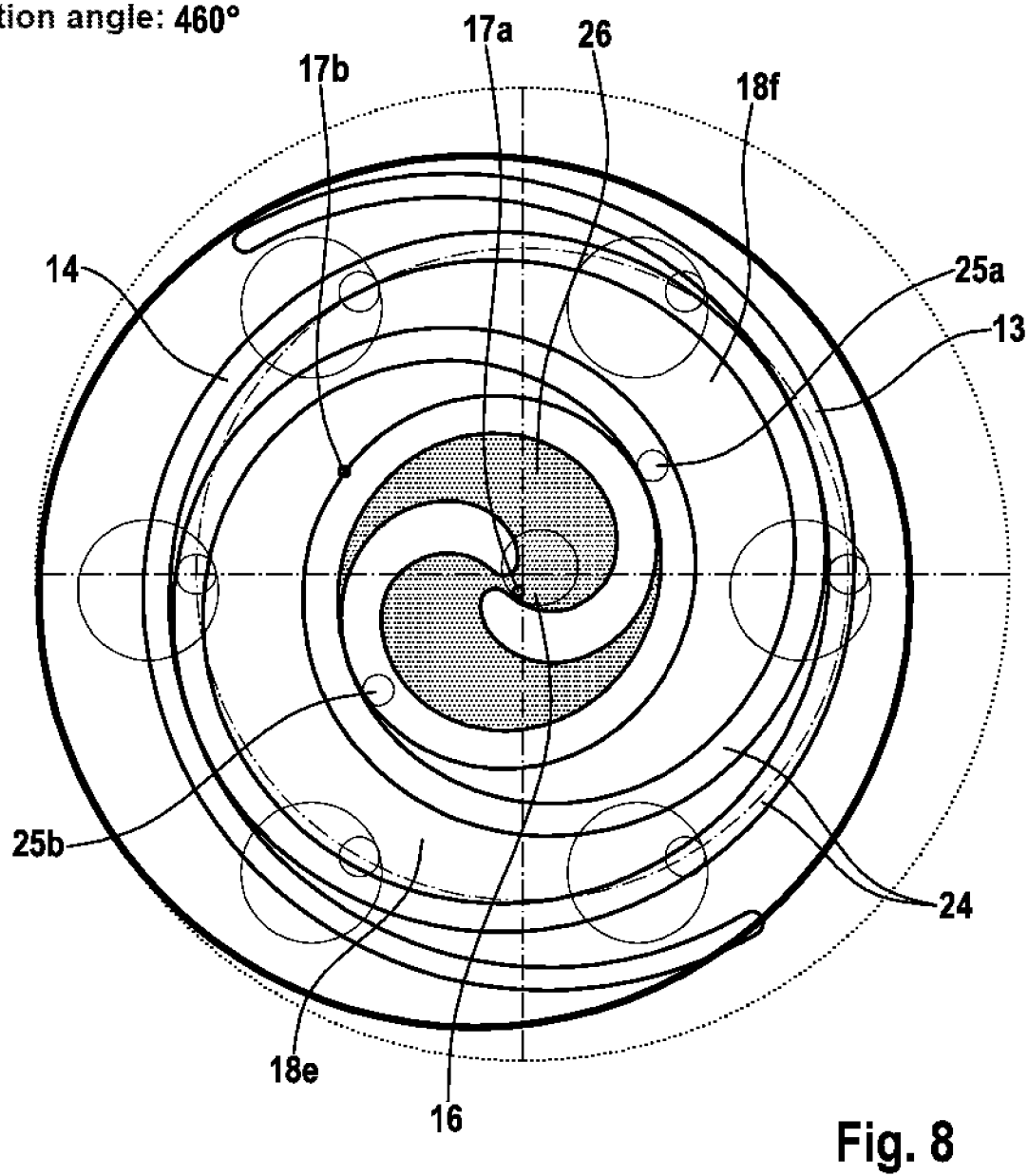
Figure 9:
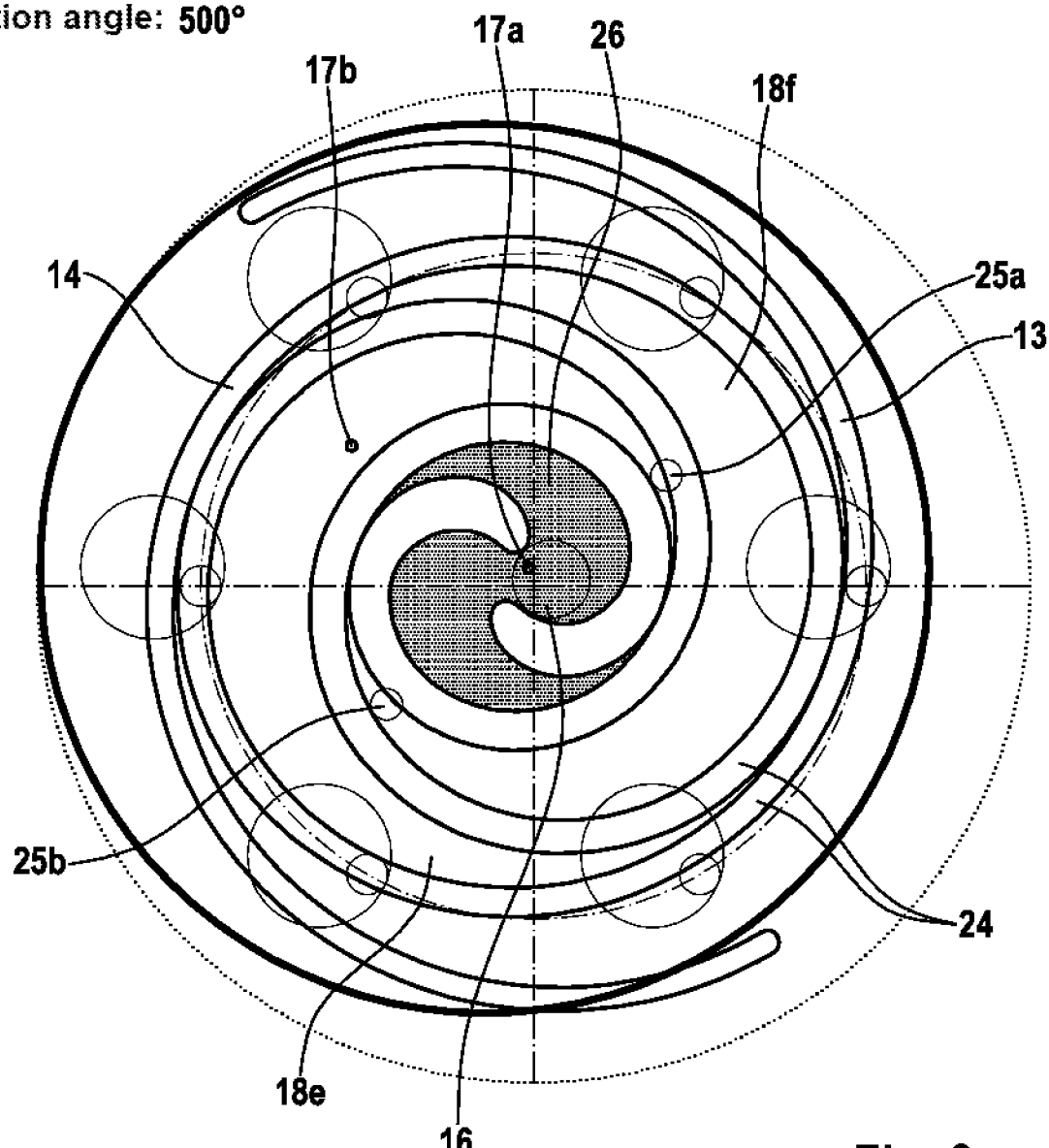
Figure 10:
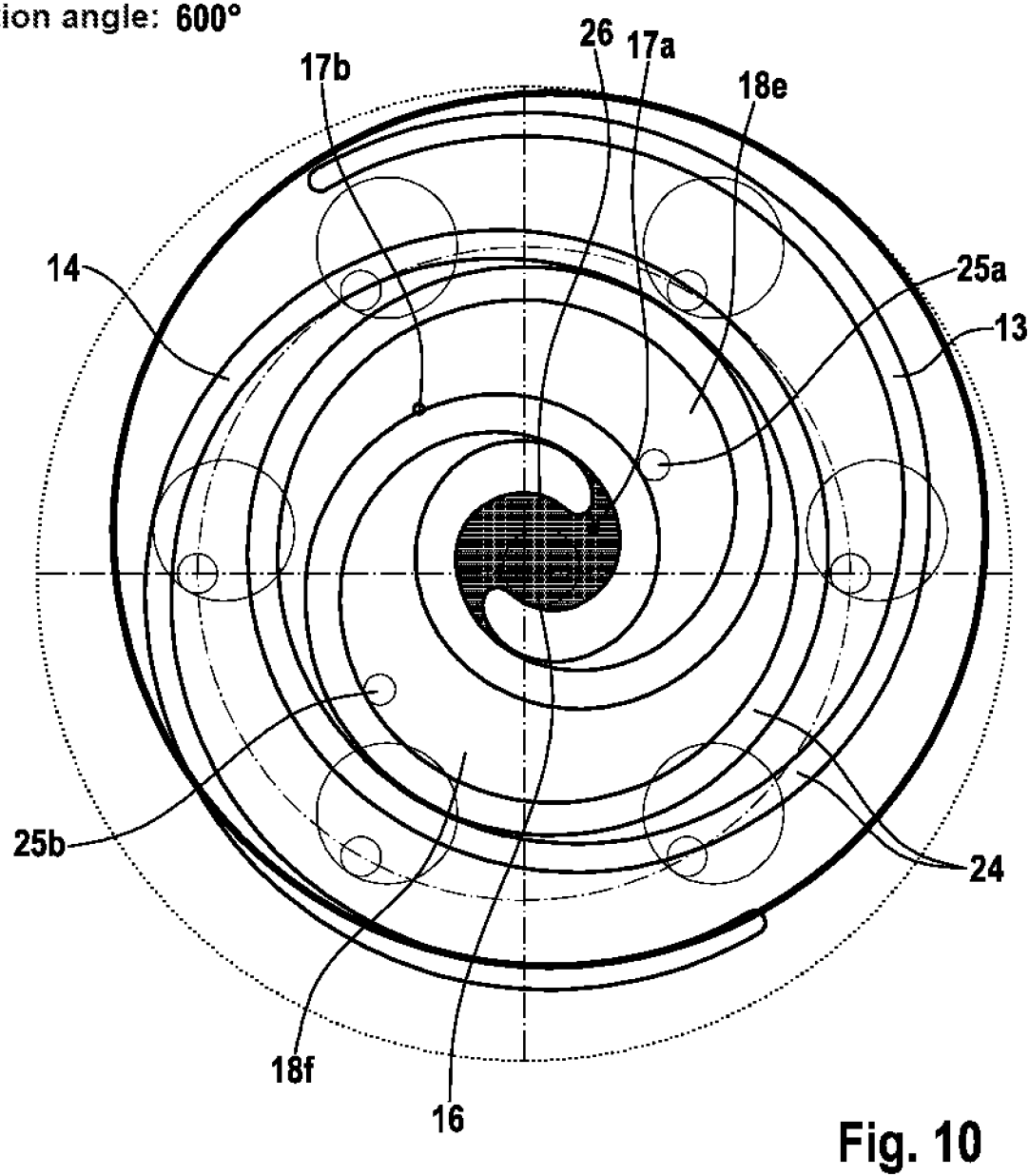
Figure 11:
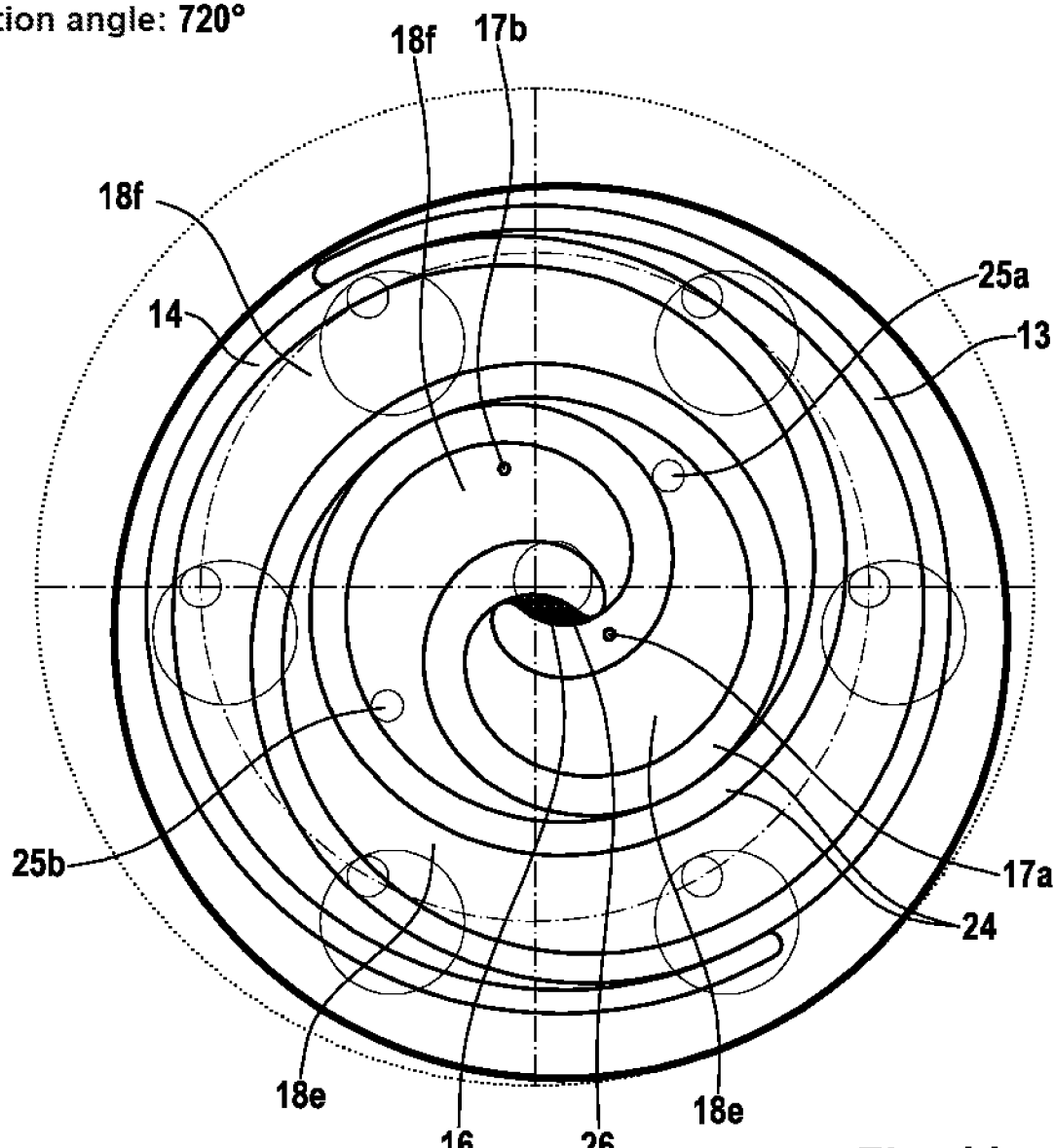

Shown therein are:

FIG. 1 a section through an exemplary embodiment according to the invention of a positive displacement machine;

FIG. 2 an additional section through the positive displacement machine according to FIG. 1;

FIG. 3 a schematic section of a counter spiral and a displacement spiral of an exemplary embodiment according to the invention of a positive displacement machine;

FIG. 4 a schematic section of a counter spiral and a displacement spiral of an exemplary embodiment according to the invention of a positive displacement machine during a compression cycle at a rotation angle of 0°;

FIG. 5 a schematic section of the positive displacement machine according to FIG. 4 at a rotation angle of 120°;

FIG. 6 a schematic section of the positive displacement machine according to FIG. 4 at a rotation angle of 260°;

FIG. 7 a schematic section of the positive displacement machine according to FIG. 4 at a rotation angle of 360°;

FIG. 8 a schematic section of the positive displacement machine according to FIG. 4 at a rotation angle of 460°;

FIG. 9 a schematic section of the positive displacement machine according to FIG. 4 at a rotation angle of 500°;

FIG. 10 a schematic section of the positive displacement machine according to FIG. 4 at a rotation angle of 600°;

FIG. 11 a schematic section of the positive displacement machine according to FIG. 4 at a rotation angle of 720°;

FIG. 1 and FIG. 2 each show a section through an exemplary embodiment according to the invention of a positive displacement machine 10, for example of the kind used in vehicle air conditioning systems.

The positive displacement machine 10 comprises a housing 19. The housing 19 has a cylindrical shape. A drive 20 is arranged in the housing 19. For example, an electric motor or a mechanical drive are possible as the drive 20. The drive 20 is connected with a shaft 21.

The shaft 21 extends in a longitudinal direction of the housing 19. An eccentric bearing 22 with an eccentric pin 23 is arranged at an axial end of the shaft 21. The eccentric bearing 22 connects the displacement spiral 13 with the shaft 21.

Inside the housing 19, a counter spiral 14 is arranged on the side of the displacement spiral 13 facing away from the eccentric bearing 22. The counter spiral 14 is fixedly and immovably arranged in the housing 19 of the positive displacement machine 10. It is possible for the counter spiral 14 to be designed in once piece with the housing 19.

A high-pressure chamber 11 is arranged on the side of the counter spiral 14 facing away from the displacement spiral 13.

An outlet opening 16 is centrally arranged in the counter spiral 14. The outlet opening 16 extends between the high-pressure chamber and the side of the counter spiral 14 facing the displacement spiral 13.

A low-pressure chamber 12 is arranged on the side of the displacement spiral 13 facing away from the counter spiral 14. A counter-pressure chamber 15 is arranged between the low-pressure chamber 12 and the displacement spiral 13.

The displacement spiral 13 is arranged in the housing 19 so that it can move in a direction parallel to the longitudinal direction of the shaft 21. In other words, the displacement spiral 13 can be shifted in the direction of the counter spiral 14 and away from the counter spiral 14. As evident on FIG. 2, a first and a second passage opening 17a, 17b are arranged in the floor of the displacement spiral 13.

The first passage opening 17a is arranged in a radially inner region of the displacement spiral 13. The second passage opening 17b is arranged in a radially outer region of the displacement spiral 13. The first and second passage opening 17a, 17b extend orthogonally to the surface of the floor. In the installed state, the passage openings 17a, 17b extend between a side of the floor facing the counter spiral 14 and a side of the floor facing away from the counter spiral 14.

The passage openings 17a, 17b each have an opening on both sides of the floor, which connect the two sides of the floor with each other. Expressed differently, the passage openings 17 form a passageway between the two sides of the floor of the displacement spiral 13. The passage openings 17a, 17b form a fluid connection with the counter-pressure chamber 15.

The passage openings 17a, 17b have a circular cross section. Other shapes are possible, for example elliptical, ovoid, or polygonal shapes. The passage openings 17a, 17b preferably have a borehole. The diameters of the passage openings 17a, 17b preferably measure between 0.1 mm and 1 mm. In particular, the diameter of the first passage opening 17a measures 0.3 mm, and the diameter of the second passages opening 17b measures 0.5 mm.

FIG. 3 shows a schematic view of a displacement spiral 13 and a counter spiral 14 of the kind that can be used in a positive displacement machine 10 according to FIG. 1 and FIG. 2.

The displacement spiral 13 and counter spiral 14 each have spiral sections 24 and a floor. The spiral sections 24 are each orthogonally arranged on the floor of the displacement spiral 13 and counter spiral 4. The spiral sections 24 have a spiral or helical geometry. In the installed state, the spiral sections 24 of the displacement spiral 13 extend in the direction of the counter spirals 14, and the spiral sections 24 of the counter spiral 14 in the direction of the displacement spiral 13. The spiral sections 24 of the displacement spiral 13 and counter spiral 14 are engaged with each other. During operation, the spiral sections 24 are each in contact with the floor of the opposing spiral 13, 14.

The intermeshing spirals 13, 14 form compression chambers 18a, 18b. Expressed differently, the compression chambers 18a, 18b are bounded by the spiral sections 24 of the displacement spiral 13 and the counter spiral 14.

The outlet opening 16 is centrally and eccentrically arranged in the counter spiral 14. Two secondary outlet openings 25a, 25b are arranged in the counter spiral 14 next to the outlet opening 16. The secondary outlet openings 25a, 25b can also be referred to as preliminary outlets. The secondary outlet openings 25a, 25b are spaced radially apart from the center of the counter spiral 14.

An inner compression chamber 26 is arranged in the radially inner region of the two intermeshing spirals 13, 14. With respect to the outlet opening, the expression "arranged in the center or middle" must thus be understood to mean that the outlet opening at least in sections temporarily overlaps the inner compression chamber 26, which is bordered by the displacement spiral 13 and counter spiral 14.

FIG. 4 to FIG. 11 schematically depict various states of a compression cycle of a positive displacement machine 10. The positions of the displacement spiral 13 and counter spiral 14 relative to each other are described below as snapshots with a focus on the geometry of the respective components as well as their function or effect. In terms of structure, the spiral arrays shown on FIGS. 4 to 11 essentially correspond to the spiral array shown on FIG. 3.

The compression cycle must be understood as a passage or period of the continuously recurring compression process.

The position of the displacement spiral 13 during a compression cycle can be represented by the rotation angle of the orbiting motion. The rotation angle of the displacement spiral 13 on FIG. 4 measures 0°.

FIG. 4 shows the first and second compression chambers 18a, 18b in the radially outer region. The two compression chambers 18a, 18b are closed.

A compression chamber 18 is closed when the compression chamber 18 is enclosed fluid tight by the spiral sections 24 of the displacement spiral 13 and counter spiral 14.

Another respective first and second compression chamber 18c, 18d are arranged in the radially inner region of the spirals 13, 14. The compression chambers 18c, 18d each have a smaller relative volume than the compression chambers 18a, 18b.

The relative volume of the compression chambers 18 must be understood as the variable volume of the compression chambers 18 at a specific point in time during the compression cycle of the positive displacement machine 10 in relation to the initial volume of the compression chambers 18 at a rotation angle of 0°.

The first passage opening 17a is covered by a spiral section 24 of the counter spiral 14. The second passage opening 17b is arranged in the second compression chamber 18d. The first passage opening 17a is therefore closed, and the second passage opening 17b is open. As a result, a fluid connection is present between the second compression chamber 18d and the counter-pressure chamber 15, and the displacement spiral 13 is pressed against the counter spiral 14.

FIG. 5 shows a snapshot at a rotation angle of 120°. The compression chambers 18a, 18b have migrated radially inward. The relative volumes of the compression chambers 18a, 18b have decreased in size.

The relative volumes of the compression chambers 18a, 18b decrease as the rotation angle increases. The decrease in relative volumes causes the pressure in the compression chambers 18a, 18b to rise.

The compression chambers 18c, 18d have combined to form an inner compression chamber 26. The inner compression chamber 26 preferably corresponds to the high-pressure region in which the first passage opening 17a is arranged.

The first passage opening 17a is arranged in the inner compression chamber 26 or the high-pressure region. The first passage opening 17a overlaps the outlet opening 16. The second passage opening 17b is arranged in the first compression chamber 18a. Both passage openings 17a, 17b are thus open, and thereby enable a fluid connection with the counter-pressure chamber 15.

The term "overlap" is to be construed to mean that both openings 17a, 16 are arranged one over the other at least in sections. The first passage opening 17a is spaced apart from the outlet opening 16 in the direction of the counter spiral 14. Expressed differently, the passage opening 17a covers, coats and—or crosses the outlet opening 16 at least in sections.

Due to the sectional overlapping of the first passage opening 17a, a highest possible pressure can be set in the counter-pressure chamber 15. As a further result thereof, the counter-pressure chamber 15 is fluidically connected with the high-pressure region for a longest possible timespan or for a large range of rotation angles.

FIG. 6 shows a view of the compression cycle at a rotation angle of 260°.

The first and second compression chambers 18a, 18b have migrated further radially inward. The relative volumes of the inner compression chamber 26 and the first and second compression chambers 18a, 18b have decreased in size. The pressure in the compression chambers 18a, 18b has thus increased further.

The first passage opening 17a is still arranged in the inner compression chamber 26. The first passage opening 17a no longer overlaps with the outlet opening 16. The second passage opening 17b is covered by a spiral section 24 of the counter spiral 14. The pressure in the counter-pressure chamber 15 on FIG. 6 results from the fluid connection between the first passage opening 17a and the inner compression chamber.

FIG. 7 shows a snapshot of the compression cycle at a rotation angle of 360°.

Two new compression chambers 18e, 18f have formed in the radially outer region of the displacement spiral 13 and counter spiral 14.

The first and second compression chambers 18a, 18b have migrated further in the direction of the center or the outlet opening 16. The relative volume of the inner compression chamber 26 has further decreased in size. The outlet opening 16 is arranged in sections in the inner compression chamber 26. In other words, the cross sectional surface of the inner compression chamber 26 is smaller than the cross sectional surface of the outlet opening 16.

The first passage opening 17a is covered by a spiral section 24 of the counter spiral 14, and thus closed. After passing the spiral section 24, the second passage opening 17b is arranged in the second compression chamber 18b and open.

FIG. 8 shows a compression process at a rotation angle of 460°.

The compression chambers 18e, 18f have migrated further in the direction of the outlet 16. The relative volumes of the compression chambers 18e, 18f have further decreased in size.

The inner compression chamber 26 produced by combining the first and second compression chambers 18c, 18d has dissolved. The first and second compression chambers 18a, 18b have combined to form a new inner compression chamber 26.

The first passage opening 17a is arranged in the inner compression chamber 26. The first passage opening 17a overlaps the outlet opening 16. The second passage opening 17b is covered in sections by the spiral section 24 of the counter spiral 14, which extends between the first compression chamber 18c and the inner compression chamber 26. The second passage opening 17b is opened in sections.

The first passage opening 17a establishes a fluid connection with the high-pressure region or the inner compression chamber 26 and counter-pressure chamber 15. This here has an advantageous effect on the pressure in the counter-pressure chamber 15, since the second passage opening 17b is not yet completely opened, but rather only in sections, so that a low pressure would at this point in time be set in the compression cycle without the first passage opening 17a.

FIG. 9 shows a snapshot of the compression cycle at 500°.

The relative volumes of the compression chambers 18e, 18f and the inner compression chamber 26 have further decreased in size.

The outlet opening 16 is completely arranged in the inner compression chamber 26. The first passage opening 17a is still arranged in the inner compression chamber 26, and overlaps the outlet opening 16. The second passage opening 17b is no longer partially, but rather completely arranged in the first compression chamber 18e. Both passage openings 17a, 17b are opened, and fluidically connected with the counter-pressure chamber 15.

On FIG. 10, the outlet opening 16 is still arranged in the inner compression chamber 26 at a rotation angle of 600°. The first passage opening 17a does not cover the outlet opening 16.

The second passage opening 17b is arranged in the first compression chamber 18e. The second passage opening 17b tangentially abuts against a spiral section 24.

FIG. 11 shows a state of the compression cycle that essentially corresponds to the state at a rotation angle of 360° (see FIG. 7), wherein the inner compression chamber 26 on FIG. 11 arose from the compression chambers 18a, 18b, as opposed to the state depicted on FIG. 7.

The shaft 21 is operatively connected with the drive 20. During operation, the rotation of the shaft 21 and the eccentric connection of the displacement spiral 13 with the shaft 21 produces an orbiting motion of the displacement spiral 13.

The working medium, for example a coolant, is aspirated out of the low-pressure chamber 12 at the beginning of a compression cycle in a radially outer region of the spirals 13, 14. The working medium is transported in the compression chambers 18 between the displacement spiral 13 and counter spiral 14. The orbiting motion of the displacement spiral 13 diminishes the relative volumes of the compression chambers 18 in order to compress the working medium.

The compression chambers 18 dissolve during the compression cycle. In other words, the compression chambers 18 are temporary. The compression chambers 18 continuously reform in the outer radial region of the spiral array during operation, and subsequently migrate into the radial interior of the spiral array. The compression chambers 18 have a spiral-shaped movement path. The first and second compression chambers 18a, 18b combine in the radial interior of the spirals 13, 14 to initially form an inner compression chamber 26. The relative volume of the inner compression chamber 26 diminishes further, until the inner compression chamber 26 dissolves. A new inner compression chamber 26 is formed immediately thereafter by two following first and second compression chambers 18c, 18d.

The compressed working medium flows out of the inner compression chamber 26 through the outlet opening 16 and into the high-pressure chamber 11.

Up to five compression chambers 18, 26 are possible in the exemplary embodiment shown on FIGS. 4 to 11. Involved here are a respective two pairs with first and second compression chambers 18a, 18b and an inner compression chamber 26. Configurations that comprise more or fewer compression chambers 18, 26 are further possible.

The orbiting motion of the displacement spiral 13 causes the passive openings 17a, 17b to move on a circular path. The passage openings 17a, 17b make it possible to fluidically connect the compression chambers 18, 26 with the counter-pressure chamber 15 during operation, so as to exert enough pressure on the displacement spiral 13, and thereby press it against the counter spiral 14.

In a compression cycle, the passage openings 17a, 17b are preferably open in the following angular ranges. The first passage opening 17a forms a fluid connection between the inner compression chamber 26 and counter-pressure chamber 15 in an angular range of the rotation angle of between 435° and 650°. In the angular range of the rotation angle of 95° to 250°, the second passage opening 17b forms a fluid connection with the first compression chamber 18a and counter-pressure chamber 15. In the angular range of between 285° and 650°, the second passage opening 17b is arranged in the second compression chamber 18b. In the angular range of the rotation angle of between 250° and 285°, the second passage opening 17b is covered by a spiral section 24 of the counter spiral 14. It is preferable but not mandatory that the first passage opening 17a be open when the second passage opening 17b is covered by a counter spiral and vice versa. In the snapshot at a rotation angle of 260° shown on FIG. 6, the second passage opening 17b is closed. The preceding compression cycle has not yet concluded. The position of the rotation angle of the preceding compression cycle corresponds to roughly 620° on FIG. 6. For this reason, the first passage opening 17a is arranged in the inner compression chamber 26, and thereby enables a fluid connection with the counter-pressure chamber 15.

During operation of the positive displacement machine 10, the second passage opening 17b is initially arranged in the first compression chamber 18a, and subsequently in the second compression chamber 18b of a compression cycle. The second passage opening 17b is arranged in one of the compression chambers 18a, 18b a respective once per compression cycle. After the second compression chamber 18b, the second passage opening 17b migrates to the first compression chamber 18c, of the following compression cycle.

A portion of the working medium flows through the passage openings 17a, 17b and into the counter-pressure chamber 15. This causes the pressure in the counter-pressure chamber 15 to increase. The pressure exerts a force on the displacement spiral 13 in an axial direction. The force acts in the direction of the counter spiral 14. Since the displacement spiral 13 can move in the axial direction, it is pressed against the counter spiral 14. Pressing the displacement spiral 13 against the counter spiral 14 leads to a compression of the working medium with the lowest possible performance losses.

In the exemplary embodiment shown on FIGS. 4 to 11, several compression cycles take place simultaneously with a time delay. The first and second compression chambers 18a, 18b and the first and second compression chambers 18c, 18d are allocated to different compression cycles. In other words, each compression cycle comprises a pair of a first and second compression chambers 18a, 18b.

REFERENCE LIST

10 Positive displacement machine
11 High-pressure chamber
12 Low-pressure chamber
13 Displacement spiral
14 Counter spiral
15 Counter-pressure chamber
16 Outlet opening
17a First passage opening
17b Second passage opening
18a First compression chamber
18b Second compression chamber
18c First compression chamber
18d Second compression chamber 18e First compression chamber
18f Second compression chamber
19 Housing
20 Drive
21 Shaft
22 Eccentric bearing
23 Eccentric pin
24 Spiral sections
25a Secondary outlet opening
25b Secondary outlet opening
26 Inner compression chamber

The invention claimed is:

1. A scroll-type positive displacement machine, in particular a scroll compressor, with a high-pressure chamber, a low-pressure chamber, an orbiting displacement spiral, a counter spiral and a counter-pressure chamber, which is arranged between the low-pressure chamber and the displacement spiral,
  wherein an outlet opening, through which a compressed working medium flows into the high-pressure chamber during operation, is arranged in the counter spiral in a high-pressure region, and wherein the displacement spiral has at least a first and a second passage opening for fluidic connection with the counter-pressure chamber,
  wherein at least the first passage opening is arranged in the region of the outlet opening, so that, during operation, the first passage opening and the outlet opening temporarily overlap at least in sections,
  wherein the first passage opening is fluidically connected with the counter-pressure chamber in an angular range of the rotation angle of the orbiting displacement spiral of 435° to 650°.

2. The positive displacement machine according to claim 1, wherein the second passage opening is arranged in a region of the displacement spiral that has a lower pressure than the pressure in the high-pressure region during operation.

3. The positive displacement machine according to claim 1, wherein the first passage opening temporarily overlaps the outlet opening by between 1% and 100%, in particular between 10% and 90%, in particular between 20% and 80%, in particular between 30% and 70%, in particular between 40% and 60%.

4. The positive displacement machine according to claim 1, wherein at least a first and a second compression chamber are designed to temporarily receive a working medium during operation, and the second passage opening is arranged in the displacement spiral, so that during operation, the orbiting motion of the displacement spiral causes the second passage opening to be temporarily arranged at least in sections in the first compression chamber, and subsequently temporarily at least in sections in the second compression chamber.

5. The positive displacement machine according to claim 4, wherein the second passage opening is arranged in an angular range of the rotation angle of the orbiting displacement spiral of 95° to 250° in the first compression chamber, and in an angular range of 285° to 650° in the second compression chamber.

6. The positive displacement machine according to claim 1, wherein the first and/or second passage opening is arranged in a section of the floor of the displacement spiral.

7. The positive displacement machine according to claim 1, wherein the first and/or second passage opening has a has a circular, elliptical, or ovoid cross section.

8. The positive displacement machine according to claim 1, wherein the first passage opening has a smaller diameter than the second passage opening, wherein the diameters measure between 0.1 mm and 1 mm.

9. The positive displacement machine according to claim 1, wherein the first passage opening has a diameter of 0.3 mm, and/or the second passage opening has a diameter of 0.5 mm.

10. The positive displacement machine according to claim 1, wherein the displacement spiral and/or the counter spiral have a chamfer at least in sections.

11. A vehicle air conditioning system with a positive displacement machine, in particular with a scroll compressor, according to claim 1.

12. A vehicle with the vehicle air conditioning system according to claim 11.

13. A vehicle with the positive displacement machine according to claim 1.

14. A method for operating a scroll-type positive displacement machine, in particular a scroll compressor, with a high-pressure chamber, a low-pressure chamber, an orbiting displacement spiral, a counter spiral and a counter-pressure chamber, which is arranged between the low-pressure chamber and the displacement spiral, wherein an outlet opening, through which a compressed working medium flows into the high-pressure chamber during operation, is arranged in the counter spiral in a high-pressure region, and wherein the displacement spiral has at least a first and a second passage opening for fluidic connection with the counter-pressure chamber,
  wherein at least the first passage opening is arranged in the region of the outlet opening, so that, during operation, the first passage opening and the outlet opening temporarily overlap at least in sections,
  wherein—the first passage opening is fluidically connected with the counter-pressure chamber in an angular range of the rotation angle of the orbiting displacement spiral of 435° to 650°,
in which,
during operation of the positive displacement machine, at least sections of the first passage opening temporarily overlap the outlet opening centrally arranged in the counter spiral, and a fluid connection is formed with the counter-pressure chamber.

* * * * *